July 15, 1924.

E. V. HARTFORD 1,501,600

MEANS FOR OPERATING THE BRAKES ON VEHICLES

Original Filed April 22, 1912   2 Sheets-Sheet 1

WITNESSES

INVENTOR
Edward V. Hartford
BY
ATTORNEY

July 15, 1924.  1,501,600
E. V. HARTFORD
MEANS FOR OPERATING THE BRAKES ON VEHICLES
Original Filed April 22, 1912  2 Sheets-Sheet 2
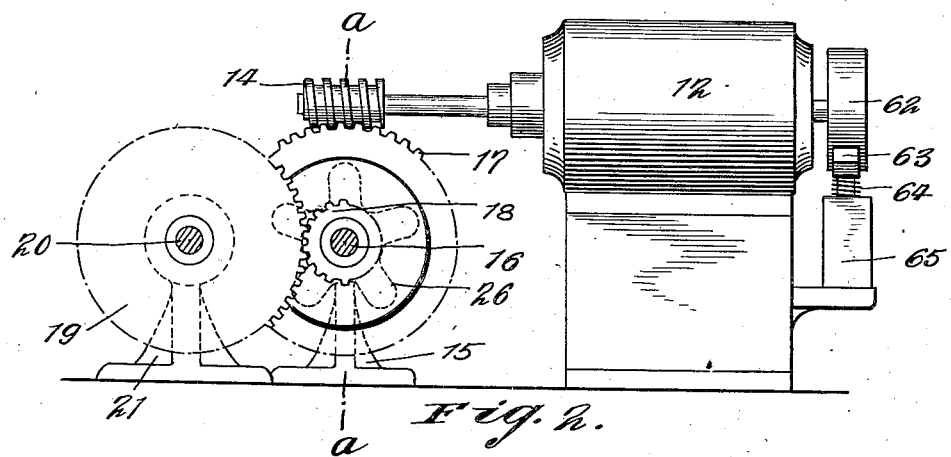
Fig. 2.
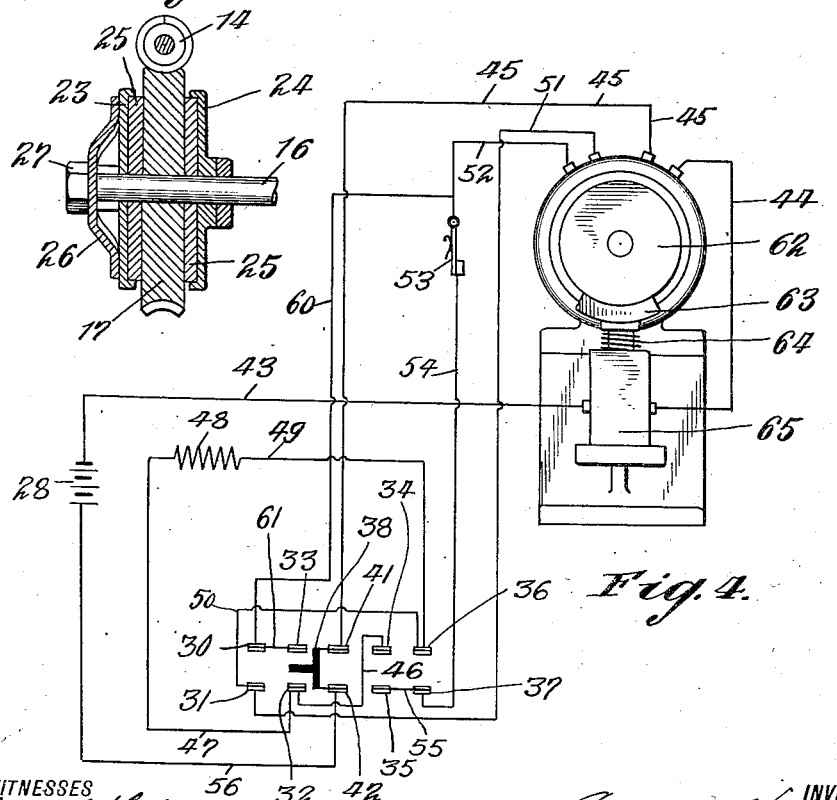
Fig. 3.
Fig. 4.
WITNESSES
INVENTOR
Edward V. Hartford
BY
ATTORNEYS Patented July 15, 1924.

1,501,600

UNITED STATES PATENT OFFICE.

EDWARD V. HARTFORD, OF DEAL, NEW JERSEY; HENRIETTA P. HARTFORD ADMINISTRATRIX OF SAID EDWARD V. HARTFORD, DECEASED.

MEANS FOR OPERATING THE BRAKES ON VEHICLES.

Application filed April 22, 1912, Serial No. 692,488. Renewed January 14, 1920. Serial No. 351,496.

*To all whom it may concern:*

Be it known that I, EDWARD V. HARTFORD, a citizen of the United States, residing at Deal, in the county of Monmouth and State of New Jersey, have invented new and useful Improvements in Means for Operating the Brakes on Vehicles, of which the following, taken in connection with the accompanying sheets of drawings, forms a complete description thereof.

This invention relates to means for operating and controlling the application of brakes on vehicles or electrically-propelled cars, etc., and the means embodying my invention are particularly adapted for such use, but it will be apparent that the same is applicable to all kinds of vehicles and I would have it so understood.

According to my invention means are provided for controlling the motive power employed for applying the brakes.

My invention comprehends suitable means for controlling the power employed for actuating brakes and includes the provision of means for releasably connecting the power means with the braking devices, so that the transmission of power to the latter may be limited to the extent desired to effect a yielding and slow application of the brakes. This feature of my invention includes an automatic power-transmission regulator co-operatively associated with the power means and brakes and is manually adjustable to effect a variable regulation of the power so that the desired degree of power may be transmitted to and utilized for operating the desired number of brakes.

My invention further includes means for automatically and mechanically controlling the energy employed for energizing the power means (the same being in the illustrated construction a motor), thus conserving and using only the necessary amount of energy for operating the brakes.

I will now describe the means embodying my invention illustrated in the accompanying drawings, and will therefore point out the novel features thereafter in the appended claims, having it understood that the illustrated and described embodiment is made by way of example and that changes in the structural details and arrangements may be made without departing from the scope and spirit of my invention.

Figure 2 is a detailed view showing a side elevation of the motor and clutch mechanism.

Figure 3 is a sectional view taken on line *a—a* of Figure 2.

Figure 4 is an end view of the motor illustrating the brake on the motor armature and showing the magnetic control.

Figure 1:
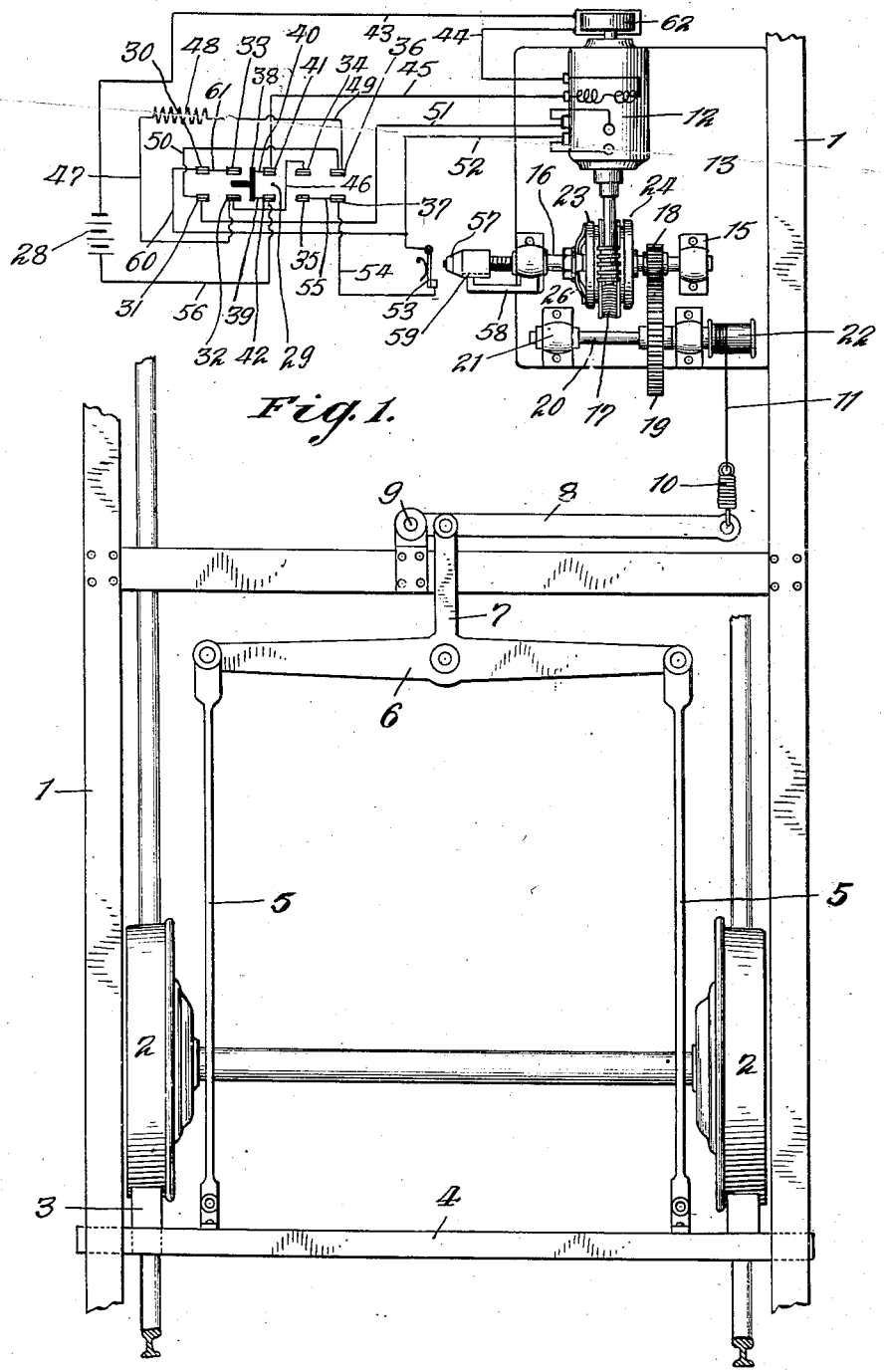
Figure 1 is a plan view of a car truck showing the application of my invention thereto.

In detail the numeral 1 indicates the underframe of a car, and 2 the wheels thereof. 3 indicates brake-shoes, and 4 the brake-beam. 5, 6, 7, and 8 are intermediate connecting arms and levers through which the power is transmitted to operate the brake-shoes on the wheels. The lever 8, having its pivotal connection at 9, is provided at its free end with coiled-spring 10, which serves as an elastic yielding connection between a cable 11 and said lever.

It will, of course, be readily understood that in applying the invention to an automobile, one would use a vehicle having the ordinary rear end wherein the braking effort is applied to a drum carried by the rear wheels which are power driven through the usual shafts and differential.

The power plant for operating the brake-shoes and intermediate devices consists of a motor 12, mounted on the bed-plate 13, suitably supported on the frame 1. The motor-shaft projects from the housing of the motor and has at its end a worm 14. Suitably supported in brackets 15, is a counter-shaft 16, having mounted thereon a worm-wheel 17, in mesh with the worm 14, and a pinion 18, in mesh with a gear-wheel 19. The gear 19 is splined to a shaft 20, journaled in suitable supporting brackets 21. Mounted on the end of the shaft 20 is a drum 22, around which the cable 11 is wound during the application of the brakes.

The worm-wheel 17 is frictionally coupled to the shaft 16 and is permitted to rotate freely thereon under certain conditions which will now be explained. A frictional clutch mechanism is here employed to effect the transmission of the desired amount of power from the worm-wheel to the shaft 16 to operate the brake. The clutch mechanism may comprise a pair of cup-shaped plates or disks 23 and 24 disposed on opposite sides of the worm-wheel 17, and having disks of friction material 25 therebetween. The disk 24 is fast on the shaft 16 and the disk 23 is splined thereto. Bearing against the disk 23 adjacent to its peripheral edge is a spider-spring 26, retained and held by a nut 27. It will be apparent that by tightening or loosening the nut 27, the adhesive tendency of the clutch may be increased or modified as desired. This mechanism while yieldable is yet inelastic, and it controls the amount of power transmitted by the motor and worm-wheel 17 to the shaft 16. It will be apparent that by tightening up the nut 27 the pressure of the spider-spring 26 will increase the friction between the clutch parts and diminish the slipping of the worm-wheel 17, so that more power may be transmitted.

The electrical energizing and controlling means and circuits that I have illustrated may be conveniently described as follows:

28 indicates a storage battery supplying the necessary power for energizing the motor 12. 29 indicates a knife-switch provided with fixed contacts 30, 31, 32, 33, 34, 35, 36, 37, and a movable element 38 provided with knife-blades 39 and 40, which are pivoted at 42 and 41.

When the knife-blades have been connected to contacts 34 and 35, a circuit has been completed to start the motor, the current flowing from battery 28, through leads or wires 43, 44, 45, through switch-arm 40, to contact 34, through wire 46, to contact 32, through wire 47, through resistance-coil 48, through wire 49, to contact 36, through wire 50, to contact 31, through wire 51, through the armature of the motor, through wire 52, through switch 53, through wire 54, to contact 37, through wire 55, through switch-arm 39, to contact 42, through wire 56, to the other pole of the battery 28.

Should it be desired to increase the speed of the motor, the switch 29 is given further movement until the knife-blades thereof engage the contacts 36 and 37, in which case the resistance circuit containing the resistance coil 48 is cut out. In this position of the switch the circuit is as follows:

From battery 28, through wires 43 and 44, through the field of the motor, through wire 45, to contact 41, through switch-blade 40, to contact 36, through wire 50, to contact 31, through wire 51, through the armature of the motor, through wire 52, through switch 53, through lead 54, to contact 37, through switch-blade 39, through wire 56, to the other pole of the battery 28.

In addition to controlling the application of the brakes by means of the friction clutch heretofore described, I have provided means for electrically regulating the winding of the cable 11 on the drum 22, so that when sufficient winding thereof has been performed to effectively apply the brakes, the energizing circuit of the motor will be automatically and mechanically broken and the motor stopped thereby. This means comprises a screw-threaded movable contact-piece 57, mounted on the screw-threaded end of the shaft 16. This contact-piece has a limited amount of lateral movement along the shaft 16 and is prevented from rotating thereon by an arm or bracket-piece 58, which has its free end working in a slot 59, provided in the contact-piece for its accommodation. This connection permits of a to-and-fro feed of the contact-piece in order to co-operate with the switch 53 and break the switch upon reaching its outward limit of travel, which it does when the drum 22 has wound the required amount of cable 11 to apply the brakes. Upon the release of the brakes, by reversing the motor it is apparent that the contact-piece 57 will be fed back along the shaft 16, permitting the switch 53 to close under action of its under-spring.

Now in order to reverse the motor to effect the unwinding of the cable and the releasing of the brakes, the switch is thrown over in the opposite direction on to contacts 32 and 33. In this position the flow of current will be as follows:

From the battery 28 through the wires 43 and 44, field of the motor and wire 45 to contact 41, thence through switch-arm 40, contact 33, wire 61, contact 30, wires 60 and 52 to the armature of the motor, thence through wire 51, contact 31, wire 50, contact 36, wire 49, resistance 48, wire 47, contact 32, switch-arm 39, contact 42 and wire 56 to the other pole of the battery 28.

Now in order to increase the reversing speed of the motor, the switch is thrown on to contacts 30 and 31, thus cutting out the resistance-coil 48. When the switch has assumed this position the circuit will be as follows:

From the battery 28 through the wires 43 and 44, field of the motor and wire 45 to contact 41, thence through switch-arm 40, contact 30, wires 60 and 52 to the armature of the motor, thence through wire 51, contact 31, switch-blade 39, contact 42 and lead 56 to the other pole of the battery.

It will be noted that moving the switch to these latter positions reverses the direction of rotation of the motor, even though the switch 53 may have been opened because the motor had previously wound the cable 11 as far as the stop device permitted.

In order to bring the armature of the motor to rest quickly upon the opening of the battery circuit, I have provided a brake which operates on a balance or fly-wheel 62, which is mounted on the motor-shaft. The brake is indicated at 63, and is normally held in contact with the fly-wheel by means of a spring 64. As soon as the motor energizing circuit is closed by the switch 38, the current flowing through the wire 43, energizes the magnet 65, which retracts the brake 63 from engagement with the flywheel 62. It will be apparent that upon the breaking of the circuit, the brake 63 will, under the influence of the spring 64, engage the fly-wheel 62 and immediately bring it to rest.

While I have shown a magnetically-operated brake, I may provide other specific means for accomplishing the same result. For instance, I may use a brake that is in frictional contact with the fly-wheel at all times or may employ different means for operating the brake upon the breaking of the energizing circuit of the motor.

It will be apparent from the description thus far that when the motor is started in the proper direction, the worm 14 rotates and operates the worm-wheel 17, which, in turn, through its frictional contact with plate 23, revolves shaft 16, gears 18 and 19 and drum 22, thereby winding the cable. As the drum 22 takes up the cable 11, lever 8, by reason of its fulcrum at 9, will apply the brakes 3, through brake-beam 4 and connecting-rods 5, 6, and 7. In this operation the spring 10, interposed between the cable 11 and lever 8, acts as an elastic yielding connection, effecting a yielding or giving action as the cable is being wound, thus effecting a uniform and slow application of the brake-shoes and bringing the vehicle to a gradual rather than an abrupt stop.

In operating the brakes it will be understood that in the event of an excess of power being delivered by the motor 12, the clutch mechanism described will take up or transmit only a sufficient quantity thereof to operate the brakes. Any excess thereof will be spent in rotating the worm-wheel 17 independently of the clutch, since the power transmitted to the wheel exceeds the adhering ability of the clutch causing the latter to slip in the manner heretofore described.

Having thus described my invention, what I claim as new herein and desire to secure by Letters Patent is:

1. The combination in a vehicle, of running gear therefor, brake-applying instrumentalities operating thereon, a high-speed motor for operating said instrumentalities, means automatically controlling the amount of motive power transmitted to the brakes, a storage battery for energizing said motor, a fly wheel carried by the armature of said motor, a brake for said fly wheel, and means for controlling the application of said brake to said fly wheel.

2. The combination in a vehicle, of running gear therefor, brake-applying instrumentalities operating thereon, a high-speed motor for operating said instrumentalities, means automatically controlling the amount of motive power transmitted to the brakes, a storage battery for energizing said motor, a fly wheel carried by the armature of said motor, a brake for said fly wheel yieldingly mounted and normally in contact therewith, and an electro-magnet in the battery circuit associated with said brake and adapted to release the brake connection upon the energizing of the motor.

3. An electric brake for vehicles, including a high speed electric motor, a driving shaft connected therewith, a driven shaft, a frictional drive mechanism mounted upon the driven shaft, adjusting means for said friction mechanism, a cable winding drum operably associated with the driven shaft, reduction gearing between the driven shaft and the cable winding drum; and means associated with the driven shaft operating to de-energize the motor when the brake applying cable has been wound upon the drum.

4. In a brake-operating mechanism, the combination of a low-voltage high-speed electric motor, brake-applying instrumentalities including a cable-winding drum, a rotatable shaft therefor, gear means interposed between said shaft and the motor armature for transmitting rotary movements to said drum, a clutch mechanism interposed between the motor and the drum, said clutch mechanism including a shaft, a disk having a clutch face, keyed fast to the shaft, a worm-wheel mounted upon, but free to rotate upon said shaft and in engagement with said disk and relatively movable thereof, a second disk provided with a clutch face mounted upon said shaft in engagement with said worm-wheel, and a spider-shaped spring mounted upon said shaft and having its feet adapted to contact with said second-mentioned disk whereby the gripping power of said clutch may be regulated.

5. In a mechanism of the class described, the combination with a driven rotary shaft, of a brake-drum mounted thereon to rotate therewith, means to apply frictional pressure to said drum, a suitably mounted electric motor, power transmission means connecting the motor and said frictional means for applying pressure to the drum, and yieldingly resisting means in said line of power transmission co-acting with the motor to cause sufficient pressure to be applied to the drum without stopping the motor and thereby prevent impairing the same.

6. A mechanism of the class described including in combination, a driven rotary shaft of an automobile, a brake-drum mounted thereon to rotate therewith, means to apply frictional pressure to said drum, an electric motor suitably mounted on the frame of the automobile, power transmission means connecting the motor and the said frictional means for applying pressure to the drum, a battery on said frame in circuit with said motor, and a manually operable stepped switch on said frame in said circuit whereby the electric energy supplied to the motor may be regulated.

In witness whereof, I have hereunto set my hand in the presence of two subscribing witnesses.

EDWARD V. HARTFORD.

Witnesses:
  JNO. A. HARTFORD,
  WILLIAM P. MONTGOMERY.